(12) United States Patent
Sakurai et al.

(10) Patent No.: US 8,748,017 B2
(45) Date of Patent: Jun. 10, 2014

(54) MAGNETIC RECORDING MEDIUM

(75) Inventors: Masatoshi Sakurai, Tokyo (JP); Yousuke Isowaki, Yokohama (JP); Soichi Oikawa, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 342 days.

(21) Appl. No.: 13/175,358

(22) Filed: Jul. 1, 2011

(65) Prior Publication Data
US 2012/0019960 A1 Jan. 26, 2012

(30) Foreign Application Priority Data

Jul. 23, 2010 (JP) ................................. 2010-166291

(51) Int. Cl.
*G11B 5/66* (2006.01)
(52) U.S. Cl.
USPC .......................................... 428/827; 360/135
(58) Field of Classification Search
USPC ..................... 360/131, 135; 369/13.54, 13.55
See application file for complete search history.

(56) References Cited

U.S. PATENT DOCUMENTS

| | | | |
|---|---|---|---|
| 8,303,828 B2 * | 11/2012 | Ishibashi et al. ................ 216/22 |
| 8,599,509 B2 * | 12/2013 | Ono et al. ....................... 360/48 |
| 2005/0157597 A1 * | 7/2005 | Sendur et al. .............. 369/13.55 |
| 2007/0159721 A1 * | 7/2007 | Honda et al. .................. 360/131 |
| 2009/0040644 A1 | 2/2009 | Lu et al. |
| 2009/0161255 A1 | 6/2009 | Maeda |
| 2009/0201607 A1 | 8/2009 | Isowaki et al. |
| 2010/0098972 A1 | 4/2010 | Maeda |

FOREIGN PATENT DOCUMENTS

| | | |
|---|---|---|
| JP | 2006-120222 | 5/2006 |
| JP | 2008-123638 | 5/2008 |
| JP | 2009-059461 | 3/2009 |
| JP | 2009-151875 | 7/2009 |
| JP | 2009-187608 | 8/2009 |

\* cited by examiner

*Primary Examiner* — Holly Rickman
(74) *Attorney, Agent, or Firm* — Knobbe, Martens, Olson & Bear, LLP

(57) ABSTRACT

According to one embodiment, a bit patterned medium includes a substrate, and a magnetic recording layer disposed above the substrate and including patterns of protrusions. Each of the protrusions contains a plurality of crystal grains. An average distance between the crystal grains is 0.5 to 3.0 nm in each of the protrusions. The protrusions include first protrusions each having a length of 1 μm or more in a radial direction of the medium and second protrusions each having a length in the radial direction shorter than the length of the first protrusion in the radial direction. Each of the first protrusions has a nucleation field Hn for magnetization reversal and a coercive force Hc satisfying the inequalities, Hn≥1.5 kOe and 0.5 kOe≤Hc−Hn≤1.5 kOe.

12 Claims, 7 Drawing Sheets

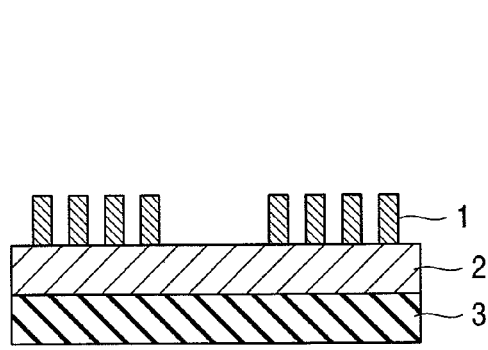
F I G. 2A
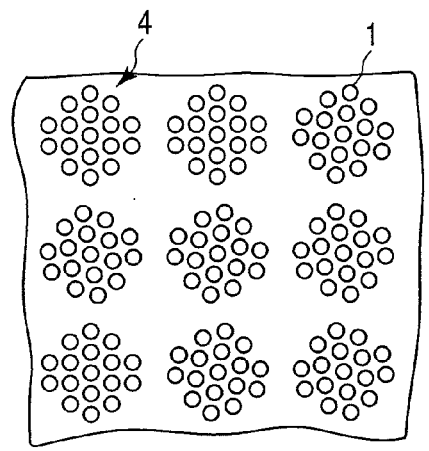
F I G. 2B
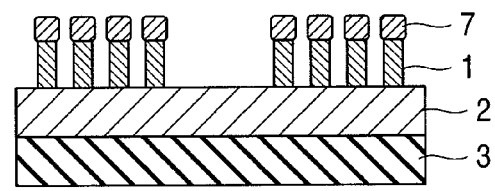
F I G. 3A
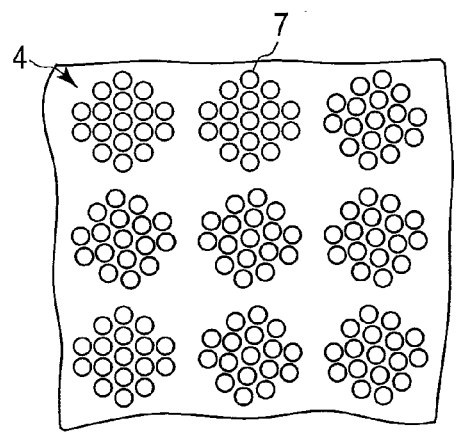
F I G. 3B
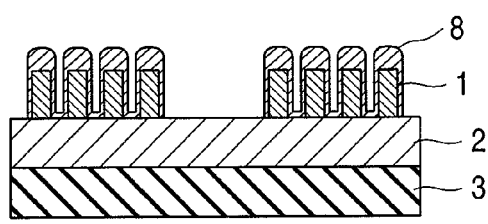
F I G. 4A
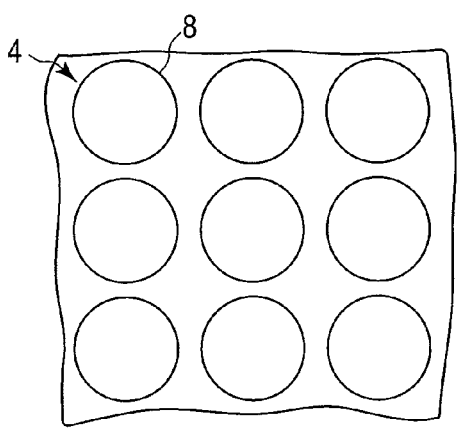
F I G. 4B

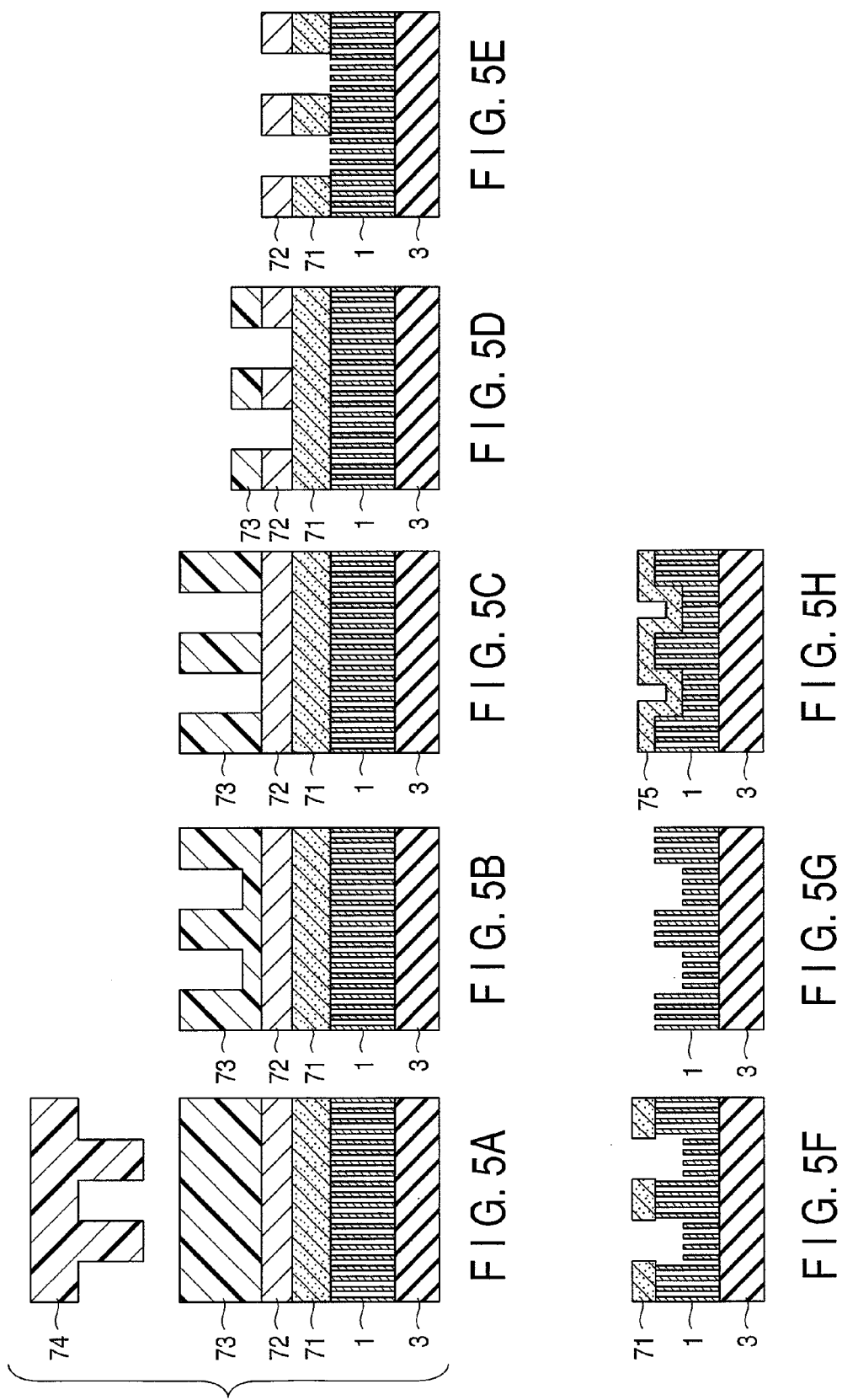

MAGNETIC RECORDING MEDIUM

CROSS-REFERENCE TO RELATED APPLICATIONS

This application is based upon and claims the benefit of priority from Japanese Patent Application No. 2010-166291, filed Jul. 23, 2010; the entire contents of which are incorporated herein by reference.

FIELD

Embodiments described herein relate generally to a magnetic recording medium.

BACKGROUND

A bit patterned medium is attracting attention for its potential of increasing the recording density and capacity of a magnetic recording apparatus. The bit patterned medium has on its surface a large number of magnetic dots formed by utilizing fine patterning technology. The magnetic dots are magnetically separated from one another. Each magnetic dot is used to store one-bit of information. In the bit patterned medium, used often as a magnetic recording layer is a so-called magnetic continuous film, which is a layer of magnetic crystal grains arranged tightly.

Meanwhile, in the case where no patterning is performed on a magnetic continuous film, i.e., in the case of an as-grown film, or in the case where this magnetic continuous film is patterned into relatively large portions, the nucleation field (Hn) for magnetization reversal and the coercive force (Hc) are as small as about a few hundred Oe. However, in the case where the magnetic continuous film is patterned into fine portions, the shapes thereof so affect the magnetic characteristics to increase Hn and Hc. That is, in the case of using the magnetic continuous film, the magnetic characteristics greatly depend on the shape thereof.

A bit patterned medium has patterns on a servo region storing head position control information, etc. and a pattern on a data region in which information is to be recorded. Specifically, these regions include microstructures made of a magnetic material. The sizes of the microstructures in the servo region differ from the sizes of the microstructures in the data region. Therefore, when using a magnetic recording layer in which magnetic crystal grains are arranged with almost no gap therebetween, the regions have different magnetic characteristics such as nucleation fields (Hn) for magnetization reversal, coercive forces (He), and saturation magnetic fields (Hs).

To be more specific, since the servo region includes microstructures having greater sizes than those of the data region, the servo region has smaller Hn and Hc. This facilitates generating reverse magnetic domains due to, e.g., the stray magnetic field or thermal fluctuation. If reverse magnetic domains are formed in the servo region, it becomes difficult for a head to access a target magnetic dot.

On the other hand, the data region includes microstructures having smaller sizes. So the variations in shape, composition, crystal grain boundary, etc. have a great influence on the variation in magnetic characteristics, e.g., switching field distribution (SFD). If the SFD is made wider, a margin of a write operation of the head to write information in the magnetic dot sharply decreases, which makes it difficult to write information in a target dot alone.

It is also important to secure the single-domain characteristics of a magnetic dot in the data region. A magnetic dot that readily forms a plurality of magnetic domains in the dot easily causes a write error when the medium is incorporated into a magnetic recording apparatus.

A CoCrPt-based granular film used in a conventional perpendicular magnetic recording medium can also be used in a patterned medium. In this case, generation of reverse magnetic domains can be prevented in the servo region because the magnetic coupling between the crystal grains is weak. However, in this case, the variations in magnetic characteristics of dots increase and the single-domain characteristics cannot be secured because the magnetic coupling between the magnetic crystal grains is weak. Accordingly, unlike the conventional perpendicular magnetic recording medium, it is unfavorable to manufacture a patterned medium using the CoCrPt-based granular film.

From the foregoing, demands have arisen for a bit patterned medium capable of preventing the formation of reverse magnetic domains in the servo region, and capable of reducing the SFD and securing the single-domain characteristics in the data region.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIGS. 2A and 2B are sectional and plan views, respectively, of a magnetic recording medium according to the first embodiment;

FIGS. 3A and 3B are sectional and plan views, respectively, of a magnetic recording medium according to the second embodiment;

FIGS. 4A and 4B are sectional and plan views, respectively, of a magnetic recording medium according to the third embodiment;

FIGS. 5A, 5B, 5C, 5D, 5E, 5F, 5G, and 5H are sectional views showing an example of a method of manufacturing the magnetic recording medium according to the embodiment;

DETAILED DESCRIPTION

Various embodiments will be described hereinafter with reference to the accompanying drawings.

In general, according to one embodiment, a bit patterned medium comprises a substrate, and a magnetic recording layer disposed above the substrate and including patterns of protrusions. Each of the protrusions contains a plurality of crystal grains. An average distance between the crystal grains is 0.5 to 3.0 nm in each of the protrusions. The protrusions includes first protrusions each having a length of 1 μm or more in a radial direction of the medium and second protrusions each having a length in the radial direction shorter than the length of the first protrusion in the radial direction. Each of the first protrusions has a nucleation field Hn for magnetization reversal and a coercive force Hc satisfying the following inequalities.

$Hn \geq 1.5$ kOe $0.5$ kOe $\leq Hc-Hn \leq 1.5$ kOe

<Bit Patterned Medium>

Figure 1:
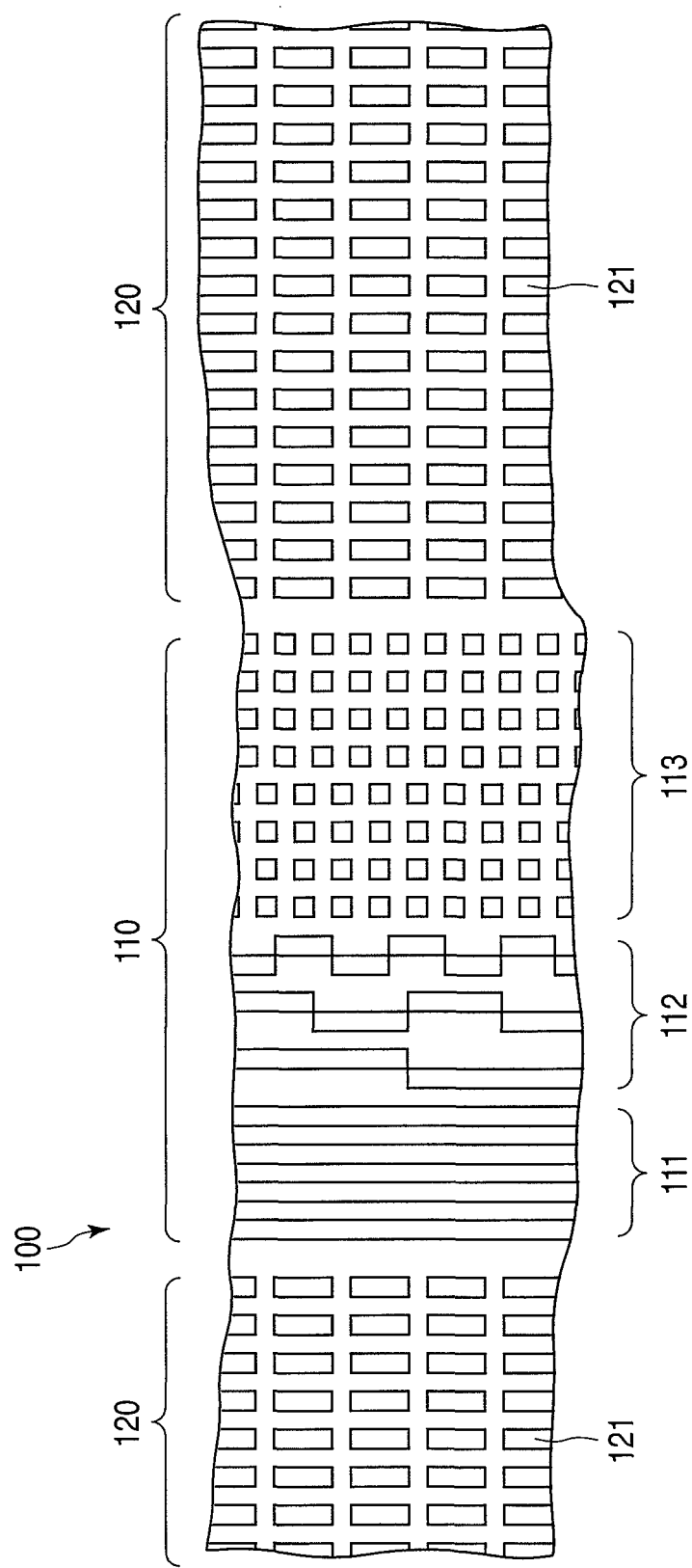
FIG. 1 is a plan view taken along the circumferential direction of a bit patterned medium according to an embodiment.

FIG. 1 shows a plane view of a bit patterned medium (BPM) of the embodiment along the circumferential direction. Servo regions 110 and data regions 120 are alternately formed along the circumferential direction of a bit patterned medium 100. The servo region 110 includes a preamble section 111, an address section 112 and a burst section 113. Magnetic dots 121 are formed in the data region 120. Note that the radial direction is a direction perpendicular to the circumferential direction.

As shown in FIG. 1, a bit patterned medium according to each embodiment includes a magnetic recording layer having patterns of protrusions. In FIG. 1, the rectangles are the protrusions, while the regions adjacent to the rectangles are recesses.

First Embodiment

FIGS. 2A and 2B are sectional and plan views, respectively, each showing a bit patterned medium according to the first embodiment.

As shown in FIG. 2A, in the medium according to the first embodiment, an underlayer 2 is stacked on a substrate 3, and a plurality of fine crystal grains 1 are formed on the underlayer 2. Note that in FIGS. 2A and 2B, the heights of the crystal grains 1 from the underlayer 2, the grain sizes, which is the widths in FIG. 2A, of the crystal grains 1, and the spacings between the crystal grains 1 are almost constant. However, variations are produced in the manufacture of an actual medium, so FIGS. 2A and 2B merely illustrate an average structure for the sake of explanation. Note also that FIGS. 2A and 2B do not show the structures of, e.g., a soft magnetic underlayer and protective film.

When the medium is viewed from above as shown in FIG. 2B, some of the crystal grains 1 are arranged in clusters to form magnetic dots 4. The magnetic dots 4 in FIG. 2B correspond to magnetic dots 121 shown in FIG. 1. Note that the other crystal grains 1 are also arranged in clusters to form the protrusions in the servo region 110 shown in FIG. 1.

The average distance between the crystal grains in each protrusion is 0.5 to 3.0 nm. If the average distance between the crystal grains is less than 0.5 nm, the strength of the exchange coupling between the crystal grains become almost equal to that of a continuous film. Consequently, the magnetic characteristics of a protrusion having a length of 1 μm or more in the radial direction of the medium, e.g., a protrusion in the servo region behave like those of a continuous film. This makes it very difficult to prevent the formation of reverse magnetic domains. On the other hand, if the average distance between the crystal grains is greater than 3.0 nm, the exchange coupling strength between the crystal grains decreases. Since this weakens the effect of averaging the variations in magnetic characteristics of the crystal grains, the variations in magnetic characteristics of the magnetic dots increase. Note that the distance between the crystal grains is measured as a length between two crystal grains 1 at a position half the height of the crystal grains 1 by cross-sectional transmission electron microscopy (TEM) of the magnetic recording medium.

The nucleation field (Hn) for magnetization reversal and coercive force (Hc) derived from the hysteresis curve that is obtained for a protrusion having a length of 1 μm or more in the radial direction satisfy the following inequalities:

$Hn \geq 1.5$ kOe, and $0.5$ kOe $\leq Hc-Hn \leq 1.5$ kOe.

Protrusions having lengths of 1 μm or more in the radial direction are mainly present in the servo region 110, e.g., in a preamble section 111 and address section 112.

The hysteresis curve can be measured by using, e.g., a Kerr effect measurement system including a CCD or the like, capable of freely selecting the position to be measured, and having a laser spot diameter of about 1 μm. Hn and Hc−Hn can be calculated from the measured hysteresis curve. Hn corresponds to a point on the hysteresis curve at which the magnetization is changed from the saturation magnetization by 10%. Note that it is possible to specify the magnetic characteristics with a higher positional accuracy when the measurement using the above-mentioned Kerr effect measurement system is combined with, e.g., MFM or AFM. It is also possible to perform direct observation by MFM in magnetic field.

If a protrusion having a length of 1 μm or more in the radial direction has Hn less than 1.5 kOe, reverse magnetic domains are formed therein when the medium is incorporated into a magnetic recording apparatus such as an HDD due to the influence of, e.g., the stray magnetic field or thermal fluctuation. This means that head position control data in the servo region is changed, and that accurate head positioning cannot be performed any longer. On the other hand, when a protrusion having a length of 1 μm or more in the radial direction has Hc and Hn that satisfy an inequality, $0.5$ kOe $\leq Hc-Hn \leq 1.5$ kOe, the exchange coupling between the crystal grains is appropriately strong. Consequently, a plurality of crystal grains in a single magnetic dot behave like a single crystal grain, thereby improving the single-domain characteristics of the magnetic dot. If Hc−Hn is greater than 1.5 kOe, the exchange coupling between the crystal grains is weak. Therefore, the magnetic characteristics of individual crystal grains are strongly reflected as in a granular medium, and the variations in magnetic characteristics of magnetic dots increase. It also becomes difficult to ensure the single-domain characteristics of a magnetic dot. If Hc−Hn is less than 0.5 kOe, the exchange coupling between the crystal grains is very strong, and the magnetic characteristics of a protrusion having a length of 1 μm or more in the radial direction behave like those of a continuous film. This makes it difficult to prevent the formation of reverse magnetic domains. Note that the values such as Hn, Hc, and Hs are derived from a hysteresis curve obtained by measurement at a field sweep rate of about 1,700 Oe/s.

The average number of the crystal grains contained in a protrusion in the data region is preferably three or more. When the average number is three or more, the variations in magnetic characteristics of the crystal grains are more averaged. This makes it possible to reduce the variations in magnetic characteristics of the magnetic dots.

The height of the crystal grains is preferably 2 to 15 nm. Since crystal grains having a height less than 2 nm are difficult to form, this is unfavorable from the viewpoint of the manufacture of the medium. On the other hand, if the height of the crystal grains is greater than 15 nm, the floating characteristic of a head worsens. This is unfavorable from the viewpoint of the performance of the magnetic recording medium.

The average grain size of the crystal grains 1 is preferably 30 nm or less. If the grain size is greater than 30 nm, the effect of the shape on the magnetic characteristics is small, and the energy of a static magnetic field becomes relatively higher than the anisotropic energy, so magnetic domains readily form. Consequently, the single-domain characteristics of a magnetic dot become difficult to maintain. When the grain size is 30 nm or less, the effect of the shape on the magnetic characteristics increases, and the influence of the anisotropic energy on the static magnetic energy becomes relatively large. This facilitates obtaining the single-domain characteristics of a magnetic dot.

The material of the crystal grains is preferably selected from the group consisting of Co, CoPt, CoPd, CoCrPt, CoCrPtB, CoRuPt, and CoCuPt. Since these materials have a high uniaxial magnetic anisotropy in an unheated solid-solution state, it is possible to form crystal grains having a high thermal stability and high magnetization bistability. Also, these Co alloys are used in the existing granular media as well, and this is advantageous from the viewpoint of medium production. CoPt is particularly preferable as the material of the crystal grains. CoPt has an especially high uniaxial magnetic anisotropy even when the Pt addition amount is small, for example, about 30 atomic % or less, and has a relatively high saturation magnetization for the amount of elements (in atomic %) added to Co, when compared with Cr, B, and Ru. Therefore, the use of CoPt widens the range of selection of medium design parameters, e.g., the grain size, height, and average inter-grain distance of the crystal grains, and hence is favorable from the viewpoint of medium design. Note that the material of the crystal grains can be specified by observing a lattice image by cross-sectional TEM, or measuring the composition ratio by, e.g., EDX or XPS.

The bit patterned medium according to the first embodiment can prevent the formation of reverse magnetic domains in the servo region, reduce the SFD in the data region, and improve the single-domain characteristics in the data region.

In the embodiments, the SFD indicates a variation in the magnetic characteristics of the magnetic dots, and particularly indicates a variation of the magnetic dots in the magnitude of a magnetic field necessary to reverse a magnetic domain. The SFD can be obtained by a simple method, e.g., a method of counting reversed dots in magnetic field using MFM, a method of obtaining $\Delta Hc/(1.35 \times Hc)$ from the hysteresis curve by the $\Delta Hc$ method, or a method of measuring a large number of recoil loops (minor loops). The SFD can also be measured by using an HDD or spin-stand tester. When calculating the SFD by the method of $\Delta Hc/(1.35 \times Hc)$, an SFD of about 12% or less is suitable for the bit patterned medium, and an SFD of 5% or less is more suitable. The SFD is preferably as low as possible. Note that the SFD obtained by the $\Delta Hc$ method means an SFD from which the influence of the magnetostatic interaction between dots is removed. Accordingly, the SFD reducing effect of the embodiments can also be confirmed by any method capable of calculating the SFD from which the influence of the magnetostatic interaction between dots is removed, instead of the $\Delta Hc$ method.

In the embodiments, the single-domain characteristics mean properties by which multiple domains are not stably or metastably formed in one magnetic dot. In other words, the single-domain characteristics mean properties by which one magnetic dot has a single magnetic domain. The single-domain characteristics are measured by, e.g., a method of performing asynchronous (or random) write using a spin-stand tester and analyzing a read signal, or a method of applying a saturation magnetic field in the in-plane direction of a dot and observing a perpendicular residual magnetization state by MFM or the like.

Note that the diameter, inter-grain distance, and height of the crystal grains 1 are each represented by an average value obtained from, e.g., measurement on the medium using planar or cross-sectional TEM.

Second Embodiment

FIGS. 3A and 3B are sectional and plan views, respectively, each showing a bit patterned medium according to the second embodiment.

As shown in FIG. 3A, in the bit patterned medium according to the second embodiment, an underlayer 2 is stacked on a substrate 3, and a plurality of crystal grains 1 are formed on the underlayer 2. In addition, magnetic portions 7 are stacked on the crystal grains 1, respectively. Each magnetic portion 7 on the crystal grain 1 is in the form of, for example, layer or particle. The average distance between the magnetic portions on one protrusion is less than that between the crystal grains in the protrusion. When the medium is viewed from above as shown in FIG. 3B, the crystal grains 1 are arranged in clusters to form magnetic dots 4 as in the first embodiment. Note that FIGS. 3A and 3B do not show the structures of, e.g., a soft magnetic underlayer and protective film. Note also that FIGS. 3A and 3B merely illustrate an average structure for the sake of explanation as in the first embodiment shown in FIGS. 2A and 2B.

The bit patterned medium according to the second embodiment can prevent the formation of reverse magnetic domains in the servo region, reduce the SFD in the data region, and improve the single-domain characteristics in the data region.

The conditions such as the inter-grain average distance and material of the crystal grains 1 of the bit patterned medium according to the second embodiment are the same as those of the first embodiment.

The material of the magnetic portions 7 can be the same as or different from that of the crystal grains 1. For example, CoPt can be used as both the material of the crystal grains 1 and the material of the magnetic portions 7, and it is also possible to use CoPt as the material of the crystal grains 1 and CoCrPtB as the material of the magnetic portions 7. When the crystal grains 1 are made of a material different from that of the magnetic portions 7 or even when the crystal grains 1 are made of the same material as that of the magnetic portions 7, if the material and film thickness or the like of the magnetic portions 7 change, the exchange coupling strength between the crystal grains changes, so the magnetic characteristics of the whole multilayered film change. Accordingly, it is favorable to appropriately select a combination of the materials of the crystal grains 1 and magnetic portions 7, and a combination of the film thicknesses or the like, from the viewpoint of, e.g., effects on the formation of reverse magnetic domains, the SFD, and the single-domain characteristics.

Third Embodiment

FIGS. 4A and 4B are sectional and plan views, respectively, each showing a bit patterned medium according to the third embodiment.

As shown in FIG. 4A, in the bit patterned medium according to the third embodiment, an underlayer 2 is stacked on a substrate 3, and a plurality of crystal grains 1 are formed on the underlayer 2. In addition, a magnetic layer 8 covers the crystal grains 1. Here, the magnetic layer 8 covers the magnetic dots 4, respectively. Note that FIGS. 4A and 4B do not show the structures of, e.g., a soft magnetic underlayer and protective film. Note also that FIGS. 4A and 4B merely illustrate an average structure for the sake of explanation as in the first embodiment shown in FIGS. 2A and 2B and the second embodiment shown in FIGS. 3A and 3B.

The bit patterned medium according to the third embodiment can prevent the formation of reverse magnetic domains in the servo region, reduce the SFD in the data region, and improve the single-domain characteristics in the data region.

The conditions such as the inter-grain average distance and material of the crystal grains 1 of the bit patterned medium according to the third embodiment are the same as those of the first embodiment.

The material of the magnetic layer 8 can be the same as or different from that of the crystal grains 1. For example, CoPt can be used as both the material of the crystal grains 1 and the material of the magnetic layer 8, and it is also possible to use CoPt as the material of the crystal grains 1 and CoCrPtB as the material of the magnetic layer 8. When the crystal grains 1 are made of a material different from that of the magnetic layer 8 or even when the crystal grains 1 are made of the same material as that of the magnetic layer 8, if the material and film thickness or the like of the magnetic layer 8 change, the exchange coupling strength between the crystal grains changes, so the magnetic characteristics of the whole multilayered film change. Accordingly, it is favorable to appropriately select a combination of the materials of the crystal grains 1 and magnetic layer 8, and a combination of the film thicknesses or the like, from the viewpoint of, e.g., effects on the formation of reverse magnetic domains, the SFD, and the single-domain characteristics.

<Manufacturing Method>

FIGS. 5A, 5B, 5C, 5D, 5E, 5F, 5G, and 5H depict an example of a method of manufacturing the bit patterned medium according to the first embodiment.

As shown in FIG. 5A, an underlayer (not shown) and a 10-nm-thick magnetic recording layer are deposited on a glass substrate 3. The magnetic recording layer is deposited at 7.0 Pa by the C3010 available from Anelva using Ar as a sputtering gas. Thus, the magnetic recording layer containing a large number of crystal grains 1 is formed. The material of the crystal grains is, e.g., CoPt. Note that when manufacturing the bit patterned media according to the second and third embodiments, for example, CoPt is deposited at 1.0 Pa by the C3010 using Ar as a sputtering gas in the second embodiment, and CoPt is deposited at 0.7 Pa by the C3010 using Ar as a sputtering gas in the third embodiment, after the crystal grains 1 are deposited. A first hard mask 71 made of 15-nm-thick carbon and a second hard mask 72 made of 3-nm-thick Si are deposited on the magnetic recording layer. Note that when depositing carbon, carbon may enter between the crystal grains. When the magnetic crystal grains of the medium thus obtained meet the required conditions of the embodiment, such a medium also complies with the embodiment. Accordingly, a nonmagnetic material such as carbon can be formed between the crystal grains. Since the portion of the carbon film above the crystal grains 1 has a thickness as great as about 15 nm, a surface of this portion is almost flat as shown in FIG. 5A. The second hard mask 72 is spin-coated with a resist 73. A stamper 74 having predetermined convexo-concave patterns corresponding to, e.g., the BPM patterns shown in FIG. 1 is prepared. The stamper 74 is manufactured through electron beam lithography, nickel electroforming, and injection molding. The patterned surface of the stamper 74 is opposed to the resist layer 73.

As shown in FIG. 5B, the patterns of the stamper 74 are imprinted on the resist layer 73, thereby transferring the convexo-concave patterns of the stamper 74 onto the resist layer 73. After that, the stamper 74 is removed. The resist residue remains at the bottoms of recesses on the resist layer 73.

As shown in FIG. 5C, the resist residue in the recesses is removed by dry etching, thereby exposing the surface of the second hard mask 72. In this step, the resist residue is removed by, e.g., an ICP-RIE system using $O_2$ as an etching gas.

As shown in FIG. 5D, the patterned resist layer 73 is used as a mask to transfer the patterns of the resist layer 73 onto the second hard mask 72 by using the RIE system. An etching gas is not particularly limited although $CF_4$ or the like can be used. An etching apparatus is also not particularly limited, and it is possible to use, e.g., an ion milling apparatus.

As shown in FIG. 5E, the patterns are transferred by etching the first hard mask 71 using the patterned second hard mask 72 as an etching mask, thereby exposing the surface of the magnetic recording layer in the recesses. This etching is performed by the ICP-RIE system using oxygen as an etching gas. In this step, a part or the whole of the patterned resist layer 73 remaining on the patterns of the second hard mask 72 is peeled off, thereby forming convexo-concave patterns that mainly include the stacks of the first hard mask 71 and second hard mask 72 as protrusions.

As shown in FIG. 5F, ion beam etching is performed to remove the remaining second hard mask 72 and deactivate the magnetism of the magnetic recording layer at the bottom of the recesses, thereby forming a nonmagnetic layer. When removing the second hard mask 72, portions of the magnetic recording layer at the bottom of the recesses, i.e., the portions of the magnetic recording layer made nonmagnetic by the magnetism deactivation may partially be etched. An example of the ion beam apparatus usable in this step is an ECR ion gun. As an etching gas, it is possible to use, e.g., He, $N_2$, or an He—$N_2$ gaseous mixture.

As shown in FIG. 5G, the remaining first hard mask 71 is removed. In this step, the first hard mask 71 is removed by, e.g., the ICP-RIE system using oxygen as an etching gas.

As shown in FIG. 5H, a 3-nm-thick protective film is formed by chemical vapor deposition (CVD).

In the above-mentioned steps, the thicknesses of the various films and the depths of the protrusions and recesses can easily be measured by using, e.g., an atomic force microscope (AFM) or cross-sectional TEM.

Note that the manufacturing method shown in FIGS. 5A, 5B, 5C, 5D, 5E, 5F, 5G, and 5H can manufacture the medium in which the magnetic recording layer remains at the bottoms of the recesses of the convexo-concave patterns. This manufacturing method can also manufacture a medium in which the portions of the magnetic recording layer at the bottoms of the recesses are completely removed. In this case, the portions of the magnetic recording layer at the bottoms of the recesses can be removed by, e.g., a method using Ar as an etching gas in the step shown in FIG. 5F.

<Explanation of Materials and the Like and Steps>

The structures included in the patterned media according to the embodiments will be explained below.

(Substrate)

As the substrate, for example, a glass substrate, an Al-based alloy substrate, a ceramic substrate, a carbon substrate or an Si single crystal substrate having an oxide surface may be used. As the glass substrate, an amorphous glass or crystallized glass can be used. Examples of the amorphous glass include a general-purpose soda-lime glass and an aluminosilicate glass. As the crystallized glass, a lithium-based crystallized glass may be exemplified. Examples of the ceramic substrate include a sintered material containing, as a major component, a general-purpose aluminum oxide, an aluminum nitride, silicon nitride or the like, and fiber-reinforced materials thereof. As the substrate, it is also possible to use a metal substrate or nonmetal substrate with an NiP layer formed thereon by plating or sputtering.

(Soft Magnetic Underlayer)

The soft magnetic underlayer (SUL) can improve read/write efficiency. Specifically, when writing information on the perpendicular magnetic recording medium, the soft magnetic underlayer allows a recording magnetic field generated by a magnetic recording head to pass therethrough in the horizontal direction. Thus, the recording magnetic field can be directed in the vertical direction below the single-pole of the magnetic recording head and return to the return yoke of the head with a minimum loss of intensity. That is, a recording magnetic field having a sufficient intensity can be applied vertically to the magnetic dot in which information is to be written. For this reason, the soft magnetic underlayer can improve read/write efficiency.

For the soft magnetic underlayer, a material containing Fe, Ni or Co may be used. Examples of such a material include FeCo-based alloys such as FeCo and FeCoV, FeNi-based alloys such as FeNi, FeNiMo, FeNiCr and FeNiSi, FeAl-based alloys and FeSi-based alloys such as FeAl, FeAlSi, FeAlSiCr, FeAlSiTiRu and FeAlO, FeTa-based alloys such as FeTa, FeTaC and FeTaN and FeZr-based alloys such as FeZrN. Materials having a microcrystalline structure such as FeAlO, FeMgO, FeTaN and FeZrN containing Fe in an amount of 60 atomic % or more or a granular structure in which fine crystal grains are dispersed in a matrix may also be used. As other materials to be used for the soft magnetic underlayer, Co alloys containing Co and at least one of Zr, Hf, Nb, Ta, Ti and Y may also be used. Such a Co alloy preferably contains 80 atomic % or more of Co. In the case of such a Co alloy, an amorphous layer is easily formed when it is deposited by sputtering. Because the amorphous soft magnetic material is not provided with crystalline anisotropy, crystal defects and grain boundaries, it exhibits excellent soft magnetism and is capable of reducing medium noise. Preferable examples of the amorphous soft magnetic material may include CoZr-, CoZrNb- and CoZrTa-based alloys.

An underlayer may further be formed beneath the soft magnetic underlayer to improve the crystallinity of the soft magnetic underlayer or to improve the adhesion of the soft magnetic underlayer to the substrate. As the material of such an underlayer, Ti, Ta, W, Cr, Pt, alloys containing these metals or oxides or nitrides of these metals may be used. An intermediate layer made of a nonmagnetic material may be formed between the soft magnetic underlayer and the recording layer. The intermediate layer has two functions including the function to cut the exchange coupling interaction between the soft magnetic underlayer and the recording layer and the function to control the crystallinity of the recording layer. As the material for the intermediate layer, Ru, Pt, Pd, W, Ti, Ta, Cr, Si, alloys containing these metals or oxides or nitrides of these metals may be used.

In order to prevent spike noise, the soft magnetic underlayer may be divided into plural layers and Ru layers with a thickness of 0.5 to 1.5 nm may be interposed therebetween to attain anti-ferromagnetic coupling. Also, a soft magnetic layer may be exchange-coupled with a pinning layer of a hard magnetic film such as CoCrPt, SmCo or FePt having longitudinal anisotropy or an anti-ferromagnetic film such as IrMn and PtMn. Magnetic films made of, for example, Co or nonmagnetic films made of, for example, Pt may be provided below and above the Ru layer to control exchange coupling force.

(Nonmagnetic Interlayer)

In the embodiments, an interlayer made of a nonmagnetic material may be formed between the soft magnetic underlayer and magnetic recording layer. The interlayer has two functions, i.e., a function to interrupt the exchange coupling interaction between the soft magnetic underlayer and recording layer, and a function to control the crystallinity of the recording layer. The interlayer is preferably a layer of Ru, Re, Pt, Pd, Ti, or a crystalline alloy containing one of these elements. To improve the crystal orientation of the perpendicular magnetic recording layer, the film thickness of the interlayer is preferably 0.5 to 50 nm. Also, the crystal orientation plane is preferably (0002) for Ru, Re, and Ti, and (111) for Pt and Pd. This makes it possible to obtain a high Ku value and high thermal stability.

The above-mentioned materials except for Ti are favorable as the interlayer material because they have a corrosion resistance against dry etching gases such as $CF_4$ and, $SF_6$. In the manufacture of the medium, a dry etching step using a gas such as $CF_4$ or $SF_6$ as an etching gas may be performed. In this case, the material of the interlayer preferably has a corrosion resistance against the etching gas, in order to prevent characteristic deterioration caused by deterioration of the interlayer, e.g., magnetic characteristic deterioration or microstructure shape deterioration due to corrosion. Note that Ti is corroded by etching gases such as $CF_4$ and $SF_6$, but usable as the interlayer material when selecting, e.g., $O_2$ as an etching gas because Ti has a corrosion resistance against $O_2$. Note also that the interlayer may be a multilayered film including two or more layers.

(Protective Film)

The protective film is provided for the purpose of preventing corrosion of the perpendicular magnetic recording layer and also preventing the surface of a medium from being damaged when the magnetic head is brought into contact with the medium. Examples of the material of the protective film include those containing C, $SiO_2$ or $ZrO_2$. Preferably, the protective film has a thickness of 1 to 10 nm. Since such a thin protective film allows the spacing between the head and medium to be reduced, it is suitable for high-density recording. Carbon may be classified into $sp^2$-bonded carbon (graphite) or $sp^3$-bonded carbon (diamond). Though $sp^3$-bonded carbon is superior in durability and corrosion resistance to graphite, it is inferior in surface smoothness to graphite because it is crystalline material. Usually, carbon is deposited by sputtering using a graphite target. In this method, amorphous carbon in which $sp^2$-bonded carbon and $sp^3$-bonded carbon are mixed is formed. Carbon in which the ratio of $sp^3$-bonded carbon is higher is called diamond-like carbon (DLC). DLC is superior in durability and corrosion resistance and also in surface smoothness because it is amorphous and therefore utilized as the surface protective film for magnetic recording media. The deposition of DLC by chemical vapor deposition (CVD) produces DLC through excitation and decomposition of raw gas in plasma and chemical reactions, and therefore, DLC richer in $sp^3$-bonded carbon can be formed by appropriately adjusting the conditions.

Preferred conditions for the individual steps of the manufacturing method will now be described.

(Imprint)

A stamper having convexo-concave patterns corresponding to recording tracks and servo data is pressed against a substrate coated with a resist, and the resist is cured, thereby transferring the convexo-concave patterns onto the resist layer.

As the resist, it is possible to use, e.g., a UV-curing resin or a general resist containing novolak as a main component. When using the UV-curing resin, the stamper material is preferably a light-transmitting material such as quartz or a resin. The UV-curing resin can be cured by ultraviolet irradiation. An ultraviolet light source can be, e.g., a high-pressure mercury lamp. When using the general resin containing novolak as a main component, a material such as Ni, quartz, Si, or SiC can be used as the material of the stamper. The resist can be cured by applying heat or pressure.

(Residue Removal)

The resist residue is removed by gaseous $O_2$ reactive ion etching (RIE) after the imprint. Although an inductively coupled plasma-RIE (ICP-RIE), which can generate a plasma at a high density at a low pressure, is preferable, an electron cyclotron resonance-RIE (ECR-RIE) or a general capacitive coupled plasma-RIE (CCP-RIE) may also be used.

(Deposition of Protective Film and Post-Treatment)

Although the carbon protective film is deposited preferably by means of CVD in order to obtain good coverage over the convexo-concave surface, it may be deposited also by means of sputtering or vacuum deposition. When CVD is used, a DLC film containing a large amount of $sp^3$-bonded carbon is formed. A lubricant may be applied to the surface of the protective film. As the lubricant, for example, a perfluoropolyether, fluorinated alcohol, fluorinated carboxylic acid or the like may be used.

<Magnetic Recording Apparatus>

Figure 6:
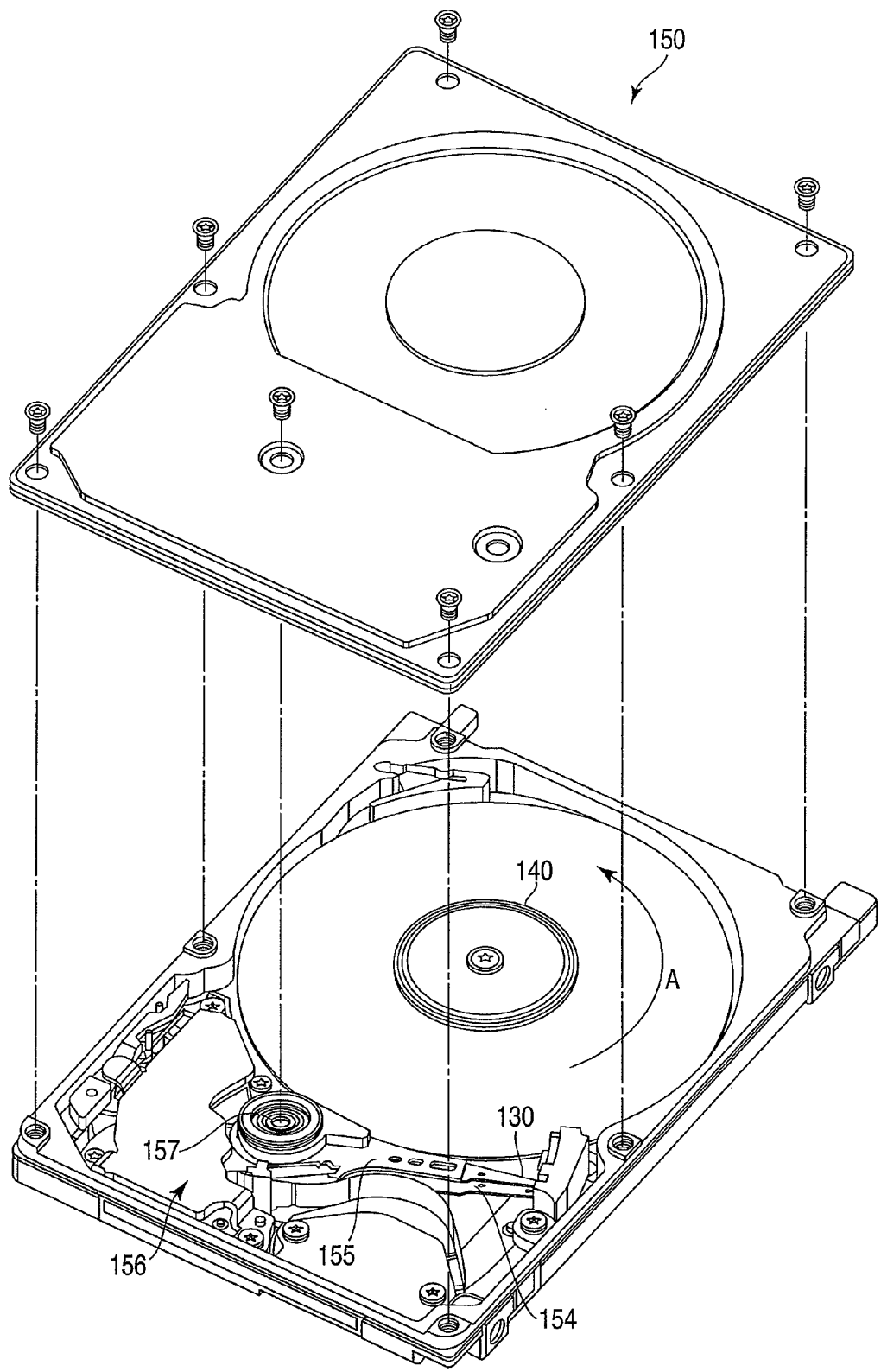
FIG. 6 is a perspective view showing a magnetic recording apparatus incorporating the bit patterned medium according to the embodiment.

Now, the magnetic recording apparatus (HDD) will be described below. FIG. 6 is a perspective view of a magnetic recording apparatus in which the bit patterned medium according to the embodiment is installed.

As shown in FIG. 6, the magnetic recording apparatus 150 according to the embodiment is of a type using a rotary actuator. The patterned medium is mounted to the spindle 140, and is rotated in the direction of arrow A by a motor (not shown) that responds to control signals from a drive controller (not shown). The magnetic recording apparatus 150 may comprise a plurality of patterned media.

The head slider 130, which is configured to read and write information on the patterned medium, is attached to the tip of the film-like suspension 154. The head slider 130 has a magnetic head mounted near the tip thereof. During the period in which the patterned medium is kept rotated, the air bearing surface (ABS) of the head slider 130 makes the head slider 130 fly over the surface of the patterned medium at a predetermined height under a balance of pressing force of the suspension 154 and the air pressure exerted on the air bearing surface (ABS) of head slider 130.

The suspension 154 is connected to one end of an actuator arm 155. A voice coil motor 156, a kind of linear motor, is provided on the other end of the actuator arm 155. The voice coil motor 156 may be formed of a magnetic circuit including a driving coil (not shown) wound around a bobbin portion of the actuator arm 155 and a permanent magnet and a counter yoke arranged opposite to each other to sandwich the coil therebetween. The actuator arm 155 is held by ball bearings (not shown) provided at two vertical positions of the pivot 157. The actuator arm 155 can freely swing by the action of the voice coil motor 156. Therefore, the magnetic head can access any position on the patterned medium.

EXAMPLES

Example 1

Bit patterned media according to the first embodiment shown in FIG. 1 were manufactured. Specifically, five types of media (1) to (5) different in distance between crystal grains were manufactured. The distance between crystal grains was adjusted by changing the Ar deposition gas pressure. In all the media, the diameter of the crystal grains was about 10 nm, the height of the crystal grains was 10 nm, the magnetic dot pitch was 80 nm, and the material of the crystal grains was CoPt. The average distances between the crystal grains measured on the media (1), (2), (3), (4) and (5) by cross-sectional TEM were 0.2 nm, 0.5 nm, 2.5 nm, 3 nm and 5 nm, respectively.

After post-processing and DC magnetization were performed on these media, read tests were conducted by using a spin-stand tester. Consequently, no reverse magnetic domain existed in the servo region except for the medium (1). In the medium (1), reverse magnetic domains were formed in the servo region. Also, in the data regions of all the media, no magnetic domain was formed in magnetic dots, so the magnetic dots had the single-domain characteristics. Then, asynchronous write was performed on the magnetic dots of each medium. Thereafter, the single-domain characteristics of the magnetic dots were checked. As a result, magnetic domains were formed only in some magnetic dots of the medium (5). Further, a magnetic field of 20 kOe was applied to the five types of media in the film in-plane direction. Then, MFM observation was performed on the magnetic dots in the data region of each media. Consequently, magnetic domains were formed only in the magnetic dots of the medium (5).

Furthermore, the hysteresis properties of the servo region and data region of each media was measured by using a Kerr effect measurement system capable of local measurement. As a consequence, protrusions in the servo region each having a length of about 1 μm or more in the radial direction had Hn of about 1.1 to 3 kOe. In the data region, Hc was about 5 to 9 kOe. The SFDs of the magnetic dots in the data region measured by using the ΔHc method were about 8.5 to 16%. The SFD was particularly high in the medium (5). For protrusions in the servo region each having a length of 1 μm or more in the radial direction, values obtained by subtracting Hn from Hc were 0.2, 0.5, 1.3, 1.5 and 2.0 kOe in the order of the media (1), (2), (3), (4) and (5).

Table 1 shows the above results.

TABLE 1

| Medium | Distance between crystal grains [nm] | Hn [kOe] | Hc [kOe] | Hc − Hn [kOe] | Hc [kOe] | SFD [%] | Adaptability |
|---|---|---|---|---|---|---|---|
| (1) | 0.2 | 1.1 | 1.3 | 0.2 | 5.0 | 10.0 | x: Reverse magnetic domain |
| (2) | 0.5 | 1.5 | 2 | 0.5 | 5.5 | 8.5 | ○ |
| (3) | 2.5 | 2.1 | 3.4 | 1.3 | 7.0 | 9.0 | ○ |
| (4) | 3 | 2.4 | 3.9 | 1.5 | 8.0 | 11.0 | ○ |
| (5) | 5 | 3 | 5 | 2.0 | 9.0 | 16.0 | x: SFD high |

Figure 7:
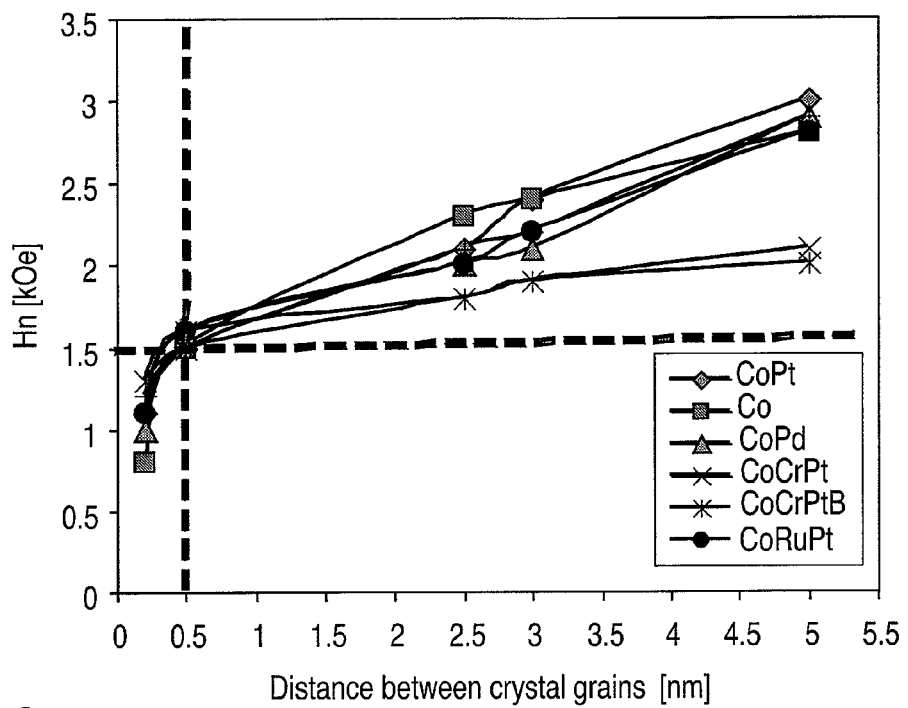
FIG. 7 is a graph showing the relationship between the nucleation field (Hn) for magnetization reversal in a servo region and the distance between crystal grains.
Figure 8:
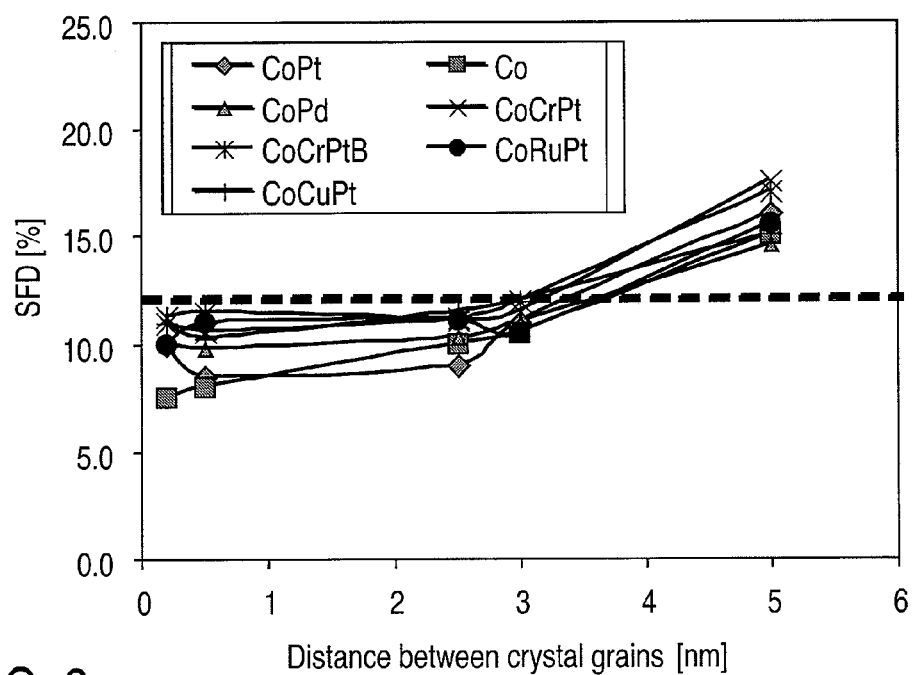
FIG. 8 is a graph showing the relationship between the magnetic characteristic variation (SFD) in a data region and the distance between crystal grains.
Figure 9:
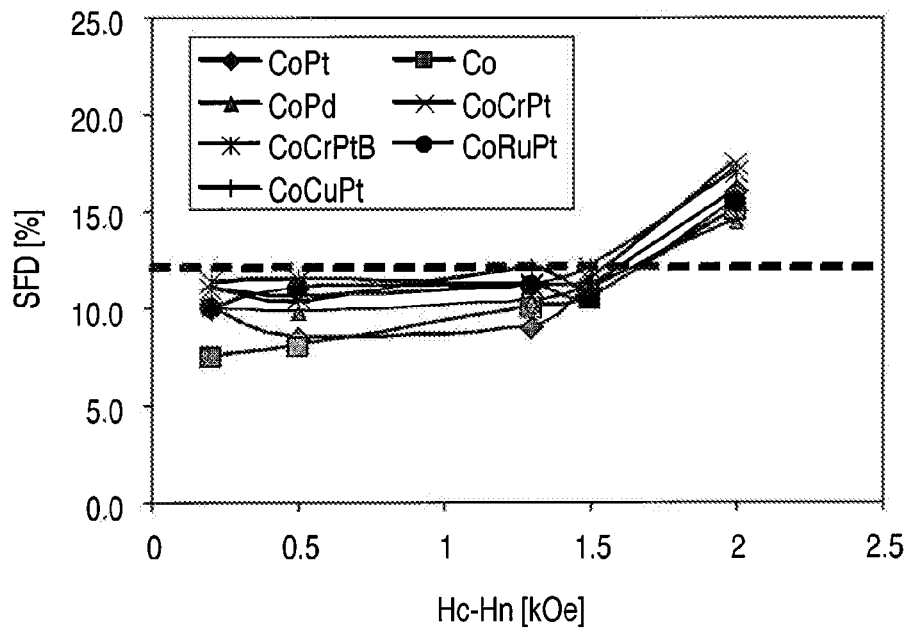
FIG. 9 is a graph showing the relationship between the SFD in the data region and a difference obtained by subtracting Hn from the coercive force (Hc) in the servo region.

FIG. 7 is a graph showing the relationship between Hn in the servo region and the distance between the crystal grains. FIG. 8 is a graph showing the relationship between the SFD in the data region and the distance between the crystal grains. FIG. 9 is a graph showing the relationship between the SFD in the data region and a difference obtained by subtracting Hn from Hc in a protrusion of the servo region having a length of 1 μm or more in the radial direction.

Table 1 and FIG. 7 reveal that no reverse magnetic domain is formed in the servo region when the distance between the crystal grains is 0.5 nm or more (i.e., Hn≥1.5 kOe and 0.5 kOe≤Hc−Hn). Table 1 and FIG. 8 show that the SFD can be decreased to 12% or less when the distance between the crystal grains is 3 nm or less. Table 1 and FIG. 9 indicate that the SFD can be decreased to 12% or less when Hc−Hn in a protrusion having a length of 1 μm or more in the radial direction is 1.5 kOe or less. From the foregoing, in a medium in which the distance between the crystal grains is 0.5 to 3 nm, and a protrusion having a length of 1 μm or more in the radial direction has Hn and Hc that satisfy the inequalities, Hn≥1.5 kOe and 0.5 kOe≤Hc−Hn≤1.5 kOe, it is well possible to prevent a reverse magnetic field from being produced in the servo region, and improve the single-domain characteristics and reduce the SFD in the data region.

Also, media were manufactured following the same procedures as above except for using Co, CoPd, CoCrPt, CoCrPtB, CoRuPt, and CoCuPt as the crystal grain materials, and the same tests were conducted. Consequently, results equal to those obtained when using CoPt were obtained.

Comparative Example 1

Figure 10A:
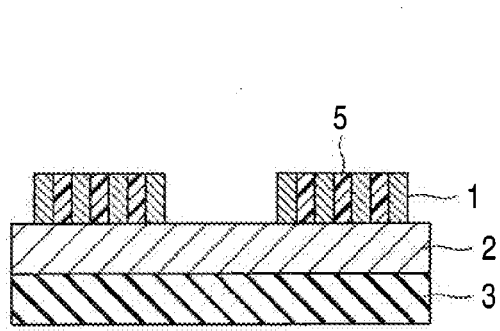
FIGS. 10A and 10B are sectional and plan views, respectively, of a conventional magnetic recording medium.
Figure 10B:
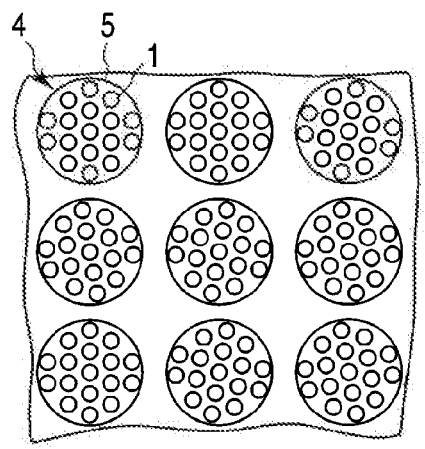

A conventional magnetic recording medium as shown in FIGS. 10A and 10B was manufactured. In this medium, protrusions are formed from a granular film containing magnetic crystal grains and a nonmagnetic material. That is, in the magnetic recording medium shown in FIGS. 10A and 10B, a plurality of crystal grains 1 exist in each magnetic dot 4, and a nonmagnetic material 5 is filled between the crystal grains 1.

More specifically, the magnetic recording medium was manufactured as follows. Ru was deposited at 0.7 Pa and then deposited at 4 Pa on a substrate 3, thereby forming an underlayer. On this underlayer, CoCrPt—SiO$_2$ was deposited at 0.7 Pa. After that, convexo-concave patterns were formed by the method shown in FIGS. 5A, 5B, 5C, 5D, 5E, 5F, 5G, and 5H. Consequently, a medium in which the crystal grains 1 were isolated by the nonmagnetic material 5 made of an oxide containing a large amount of SiO$_2$ was obtained. The height of the crystal grains 1 was 10 nm, the grain size of the crystal grains was about 10 nm, and the distance between the grains was 1 nm.

The presence of reverse magnetic domains in the servo region and the single-domain characteristics in the data region of this bit patterned medium were checked by the same methods as in Example 1. As a consequence, the formation of magnetic domains in the magnetic dots was confirmed by both asynchronous write using a spin-stand tester and MFM observation after in-plane magnetic field saturation. In addition, the Kerr effect measurement revealed that Hc−Hn in the protrusions of the servo region each having a length of 1 μm or more in the radial direction was very large, i.e., about 3 kOe. This is so presumably because the exchange coupling strength between the micro magnetic grains was weak, so the effect of averaging the magnetic characteristic variations between the grains decreased, the influence of the magnetic characteristics of the individual crystal grains increased, and this facilitated the formation of magnetic domains in the magnetic dots.

From the foregoing, in a bit patterned medium in which the pattern protrusions are formed by the granular film containing the magnetic crystal grains and nonmagnetic material, it is difficult to prevent reverse magnetic domains from being produced in the servo region and improve the single-domain characteristics in the data region at the same time.

Comparative Example 2

Figure 11A:
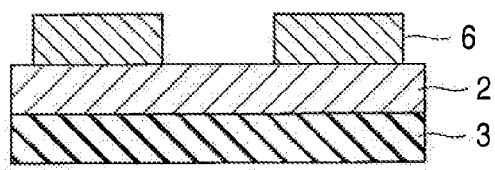
FIGS. 11A and 11B are sectional and plan views, respectively, of a conventional magnetic recording medium.
Figure 11B:
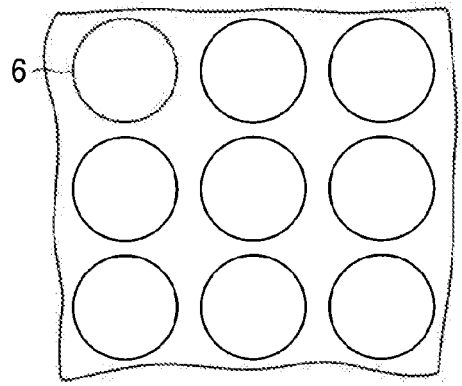

A conventional magnetic recording medium as shown in FIGS. 11A and 11B was manufactured. In this medium, protrusions are formed by magnetic continuous layers 6 in each of which crystal grains are closely arranged such that they are in contact with one another.

Specifically, the magnetic recording medium was manufactured by the method shown in FIGS. 5A, 5B, 5C, 5D, 5E, 5F, 5G, and 5H except that the magnetic recording layer was deposited at 0.7 Pa. Consequently, obtained was a bit patterned medium in which the height of crystal grains 1 was 10 nm and the grain size of the crystal grains was about 10 nm.

The presence of reverse magnetic domains in the servo region and the single-domain characteristics in the data region of this bit patterned medium were checked by the same methods as in Example 1. As a consequence, the single-domain characteristics of magnetic dots were good, but a large number of reverse magnetic domains were formed in the servo region, and the propagation of magnetic domain walls occurred with the elapse of time. Note that protrusions of the servo region each having a length of 1 μm or more in the radial direction had Hn of 0.6 kOe and Hc−Hn of 0.2 kOe.

From the foregoing, a bit patterned medium in which the crystal grains are closely arranged such that they are in contact with one another is unfavorable from the viewpoint of the prevention of reverse magnetic domains in the servo region.

Example 2

Bit patterned media according to the first embodiment as shown in FIG. 1 were manufactured. Specifically, four types of media (1) to (4) different in grain size of crystal grains were manufactured by appropriately adjusting the sputtering pressure during deposition and annealing after sputtering. CoPt was used as the material of the crystal grains. The height of the crystal grains was 10 nm. Used was a stamper having a convexo-concave pattern that corresponds to magnetic dots arranged at a pitch of 150 nm. The duration of etching performed on the second hard mask 72 by RIE using gaseous CF$_4$ was adjusted in the step shown in FIG. 5D, such that the average number of crystal grains per magnetic dot was about three. Note that the average number of crystal grains per magnetic dot and the height of the crystal grains were checked by cross-sectional TEM and planar TEM images. The average grain size of the crystal grains on the media (1), (2), (3) and (4) by cross-sectional TEM were 5 nm, 10 nm, 30 nm and 35 nm, respectively. The distance between the crystal grains measured by cross-sectional TEM was about 1 nm in all the media.

The same measurements as that in Example 1 were performed on these four types of media. Consequently, in the media (1), (2) and (3), the protrusions of the servo region each having a length of 1 μm or more in the radial direction had Hn and Hc that satisfied the inequalities, Hn≥1.5 kOe and 0.5 kOe≤Hc−Hn≤1.5 kOe, i.e., no reverse magnetic domain was formed in the servo region, and the data region had the single-domain characteristics. In addition, the SFD in the data region was about 9 to 10% in the media (1), (2) and (3). On the other hand, in the medium (4), the formation of magnetic domains in the magnetic dots was confirmed by both asynchronous write using a spin-stand tester and MFM observation after in-plane magnetic field saturation, i.e., it was impossible to obtain the single-domain characteristics. Table 2 shows the details.

From the foregoing, when the grain size of the crystal grains is 30 nm or less, it is particularly well possible to prevent reverse magnetic domains in the servo region, and improve the single-domain characteristics and reduce the SFD in the data region.

TABLE 2

| Medium | Crystal grain size [nm] | Servo region | | Hc – Data region | | | Adaptability |
|---|---|---|---|---|---|---|---|
| | | Hn [kOe] | Hc [kOe] | Hn [kOe] | Hc [kOe] | SFD [%] | |
| (1) | 5 | 1.7 | 3.2 | 1.5 | 5.5 | 10 | o |
| (2) | 10 | 2.1 | 3.6 | 1.5 | 6.1 | 9.5 | o |
| (3) | 30 | 1.6 | 2.8 | 1.2 | 5.1 | 9 | o |
| (4) | 35 | 1.5 | 2.4 | 0.9 | 4.5 | 8.5 | x: Multi-domain |

Example 3

Bit patterned media according to the first embodiment as shown in FIG. 1 were manufactured. Specifically, three types of bit patterned media (1) to (3) different in average number of crystal grains per magnetic dot were manufactured by appropriately adjusting the duration of etching performed on the second hard mask 72 by RIE using gaseous $CF_4$ in the step shown in FIG. 5D. Used was a stamper having a convexo-concave pattern that corresponds to magnetic dots arranged at a pitch of 100 nm. CoPt was used as the material of the crystal grains. The height of the crystal grains, the grain size of the crystal grains, and the average distance between the crystal grains checked by cross-sectional and planar TEM were 10 nm, 10 nm and 0.5 nm, respectively. Furthermore, the average numbers of crystal grains per magnetic dot measured on the media (1), (2) and (3) using a planar TEM were two, three and five, respectively.

Figure 12:
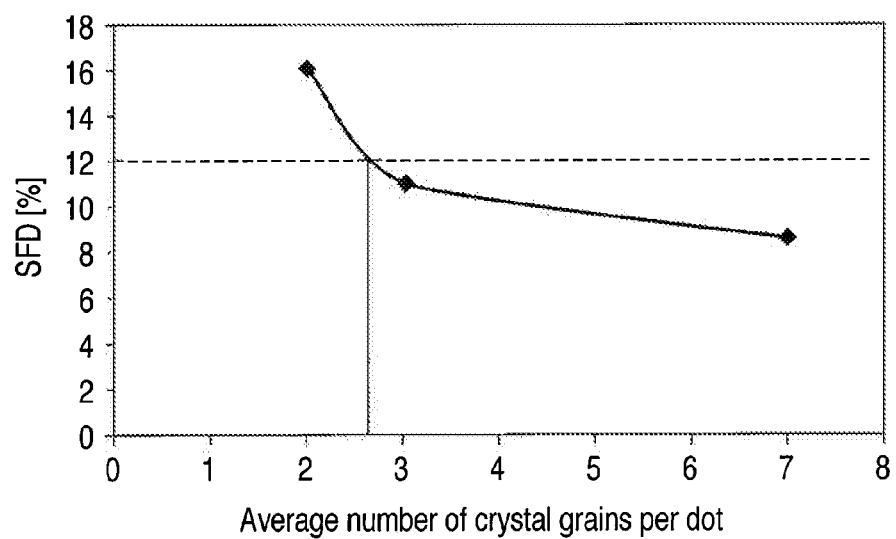
FIG. 12 is a graph showing the relationship between the SFD in the data region and the average number of crystal grains per dot.

The same measurements as that in Example 1 were performed on these three types of media. Consequently, in all the media, the protrusions of the servo region each having a length of 1 μm or more in the radial direction had Hn and Hc that satisfied the inequalities, Hn≥1.5 kOe and 0.5 kOe≤Hc−Hn≤1.5 kOe, i.e., no reverse magnetic domain was formed in the servo region, and the data region had the single-domain characteristics. The SFDs of the magnetic dots in the data region measured by using the ΔHc method were 16%, 9.4% and 8.5% for the media (1), (2) and (3), respectively. That is, only the value for medium (1) was very high. This is probably because the number of crystal grains in the magnetic dots decreased, and this deteriorated the effect of averaging the variations in magnetic characteristics of the crystal grains caused by exchange coupling. Table 3 shows the details. FIG. 12 shows the relationship between the SFD in the data region and the average number of crystal grains per dot.

TABLE 3

| Medium | Average number of crystal grains per dot | Servo region | | Hc – Data region | | | Adaptability |
|---|---|---|---|---|---|---|---|
| | | Hn [kOe] | Hc [kOe] | Hn [kOe] | Hc [kOe] | SFD [%] | |
| (1) | 2 | 1.6 | 2.6 | 1 | 4.6 | 16 | x: SFD high |
| (2) | 3 | 1.7 | 2.5 | 0.8 | 6.5 | 9.4 | o |
| (3) | 7 | 1.6 | 2.3 | 0.7 | 5.5 | 8.5 | o |

When the average number of crystal grains per magnetic dot is three or more, it is well possible to prevent reverse magnetic domains in the servo region, improve the single-domain characteristics in the data region, and reduce the SFD in the data region.

Example 4

Bit patterned media according to the first embodiment as shown in FIG. 1 were manufactured. Specifically, four types of bit patterned media (1) to (4) different in height of crystal grains were manufactured by appropriately adjusting the duration of sputtering for depositing the magnetic film. The heights of the crystal grains of the media (1), (2), (3) and (4) checked by cross-sectional TEM were 2 nm, 10 nm, 15 nm and 20 nm, respectively. Also, the grain size of the crystal grains and the distance between the crystal grains checked by cross-sectional and planar TEM were 10 nm and 1.0 nm, respectively. Note that the protrusions of each bit patterned medium had the same height as that of the crystal grains, and no planarization by burying or the like was performed.

The same measurements as that in Example 1 were performed on these four types of media. Consequently, the protrusions of the servo region each having a length of 1 μm or more in the radial direction had Hn and Hc that satisfied the inequalities, Hn≥1.5 kOe and 0.5 kOe≤Hc−Hn≤1.5 kOe, i.e., no reverse magnetic domain was formed in the servo region, and the data region had favorable single-domain characteristics. The SFDs of the magnetic dots in the data region was about 10% in all the media. Note that in the medium (4), the floating characteristics of a head worsened because of the influence of the concave-convex pattern, so an experiment using the spin-stand tester was performed at a rotational speed of 15,000 rpm. Furthermore, when the spin-stand tester was set at a rotational speed of 7,200 rpm, which was equal to that of an HDD for medium 4, the head did not float. Table 4 shows the above results.

TABLE 4

| Medium | Height of crystal grains [nm] | Servo region | | Hc – Data region | | | Adaptability |
|---|---|---|---|---|---|---|---|
| | | Hn [kOe] | Hc [kOe] | Hn [kOe] | Hc [kOe] | SFD [%] | |
| (1) | 2 | 1.6 | 2.2 | 0.6 | 5 | 10.5 | o |
| (2) | 10 | 1.7 | 2.8 | 1.1 | 6.4 | 9.7 | o |
| (3) | 15 | 1.7 | 3.1 | 1.4 | 7 | 10.3 | o |
| (4) | 20 | 1.6 | 3.3 | 1.7 | 7.3 | 10.2 | x: Insufficient head floatability |

From the foregoing, in the four types of manufactured bit patterned media, good results were obtained for the prevention of reverse magnetic domains in the servo region, the single-domain characteristics in the data region, and the SFD reducing effect. From the viewpoint of the head floatability, the media (1) to (3) are favorable. That is, the height of the crystal grains is more preferably 2 to 15 nm.

Example 5

A bit patterned medium according to the second embodiment as shown in FIGS. 3A and 3B was manufactured. Specifically, manufactured was a medium in which the magnetic portions 7 were stacked on the crystal grains 1 and the average distance between the magnetic portions 7 in each protrusion was shorter than that between the crystal grains 1 in the protrusion. As the magnetic portions 7, CoPt was deposited to have a thickness of 3 nm at an Ar gas pressure of 1.0 Pa. The rest of the pattern formation method was the same as that of the manufacturing method shown in FIGS. 5A, 5B, 5C, 5D, 5E, 5F, 5G and 5H.

Note that CoPt was used as the material of the crystal grains 1. From cross-sectional and planar TEM of the obtained medium, the distance between the magnetic portions 7 was 1.0 nm, the height of the crystal grains 1 was 10 nm, the grain size was 10 nm, and the inter-grain distance was 2.5 nm. These values fall within the range in which good results in preventing the reverse magnetic domains in the servo region and in achieving the single-domain characteristics in the data region were obtained in Example 1.

The same measurements as that in Example 1 were performed on this medium. Consequently, the protrusions of the serve region each having a length of 1 µm or more in the radial direction had Hn of 1.5 kOe and Hc−Hn of 1.0 kOe, i.e., no reverse magnetic domain was formed in the servo region. In addition, in the data region, the single-domain characteristics were good, and the SFD was 8.5%, i.e., had a favorable magnitude. Table 5 shows the details.

TABLE 5

| Servo region | | | Data region | | |
|---|---|---|---|---|---|
| Hn [kOe] | Hc [kOe] | Hc − Hn [kOe] | Hc [kOe] | SFD [%] | Adaptability |
| 1.5 | 2.5 | 1 | 5.3 | 8.5 | ○ |

From the foregoing, the bit patterned medium according to the second embodiment is suitable for preventing reverse magnetic domains in the servo region, and improving the single-domain characteristics and reducing the SFD in the data region.

Example 6

A bit patterned medium according to the third embodiment as shown in FIGS. 4A and 4B was manufactured. Specifically, a bit patterned medium in which the magnetic layer 8 covered the crystal grains 1 was manufactured. The magnetic layer 8 was deposited to have a thickness of 3 nm at an Ar gas pressure of 0.7 Pa by using CoZrTa as the material. The rest of the pattern formation method was the same as that of the manufacturing method shown in FIGS. 5A, 5B, 5C, 5D, 5E, 5F, 5G and 5H. Note that CoPt was used as the material of the crystal grains 1. From cross-sectional and planar TEM of the obtained medium, the height of the crystal grains 1 was 10 nm, the grain size was 10 nm, and the inter-grain distance was 2.5 nm. These values fall within the range in which good results in preventing the reverse magnetic domains in the servo region and achieving the single-domain characteristics in the data region were obtained in Example 1.

The same measurements as that in Example 1 were performed on this medium. Consequently, the protrusions of the serve region each having a length of 1 µm or more in the radial direction had Hn of 1.5 kOe and He−Hn of 0.8 kOe, i.e., no reverse magnetic domain was formed in the servo region. In addition, in the data region, the single-domain characteristics were good, and the SFD was 8.0%, i.e., had a favorable magnitude. Table 6 shows the details.

TABLE 6

| Servo region | | | Data region | | |
|---|---|---|---|---|---|
| Hn [kOe] | Hc [kOe] | Hc − Hn [kOe] | Hc [kOe] | SFD [%] | Adaptability |
| 1.5 | 2.3 | 0.8 | 5 | 8 | ○ |

From the foregoing, the bit patterned medium according to the third embodiment is suitable for preventing reverse magnetic domains in the servo region, and improving the single-domain characteristics and reducing the SFD in the data region.

Example 7

A bit patterned medium according to the third embodiment as shown in FIGS. 4A and 4B was manufactured. Specifically, a bit patterned medium in which the magnetic layer 8 covered the crystal grains 1 was manufactured.

The medium was manufactured following the same procedures as in Example 6 except that CoPt was used instead of CoZrTa as the material of the magnetic layer 8. In the obtained medium, the conditions of the crystal grains 1 were the same as those of Example 6.

The same measurements as that in Example 1 were performed on this medium. Consequently, the protrusions of the serve region each having a length of 1 µm or more in the radial direction had Hn of 1.6 kOe and Hc−Hn of 0.3 kOe, i.e., no reverse magnetic domain was formed in the servo region. In addition, in the data region, the single-domain characteristics were good, and the SFD was 8.5%, i.e., had a favorable magnitude. Table 7 shows the details.

TABLE 7

| Servo region | | | Data region | | |
|---|---|---|---|---|---|
| Hn [kOe] | Hc [kOe] | Hc − Hn [kOe] | Hc [kOe] | SFD [%] | Adaptability |
| 2 | 2.3 | 0.3 | 6 | 8.5 | ○ |

From the foregoing, the bit patterned medium according to the third embodiment in which the crystal grains 1 and magnetic layer 8 were made of the same material is suitable for preventing reverse magnetic domains in the servo region, and improving the single-domain characteristics and reducing the SFD in the data region.

In the above-mentioned embodiments and examples, it is possible to provide a bit patterned medium in which the formation of reverse magnetic domains in the servo region is prevented, and the SFD is reduced and the single-domain characteristics are improved in the data region, and to provide a magnetic recording apparatus using the medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A bit patterned medium comprising:
   a substrate; and
   a magnetic recording layer positioned above the substrate and provided a servo region and a data region,
   wherein the servo region comprises first protrusion patterns each having a length of 1 μm or more in a radial direction of the medium,
   the data region comprises one or more of second protrusion patterns each having a length in the radial direction shorter than the length of the first protrusion patterns in the radial direction,
   each of the first and the second protrusion patterns comprises a plurality of crystal grains, an average distance between the crystal grains being 0.5 to 3.0 nm,
   magnetic portions are respectively stacked on the crystal grains in each of the first and the second protrusion patterns, wherein an average distance between the magnetic portions on one of the first and the second protrusion patterns is less than the average distance between the crystal grains, and
   a nucleation field Hn for magnetization reversal and a coercive force Hc in each of the first protrusion patterns satisfy the following inequalities;

$Hn \geq 1.5$ kOe and $0.5$ kOe $\leq Hc - Hn \leq 1.5$ kOe.

2. The bit patterned medium of claim 1, wherein a height of the crystal grains is 2 to 15 nm.

3. The bit patterned medium of claim 1, wherein an average grain size of the crystal grains is less than or equal to 30 nm.

4. The bit patterned medium of claim 1, wherein a material of the crystal grains is selected from one or more of the following: Co, CoPt, CoPd, CoCrPt, CoCrPtB, CoRuPt and CoCuPt.

5. The bit patterned medium of claim 4, wherein the material of the crystal grains is CoPt.

6. A magnetic recording apparatus comprising:
   a bit patterned medium comprising:
   a substrate; and
   a magnetic recording layer positioned above the substrate and provided a servo region and a data region, and
   a magnetic head configured to write information on the bit patterned medium
   wherein the servo region comprises first protrusion patterns each having a length of 1 μm or more in a radial direction of the medium,
   the data region comprises one or more of second protrusion patterns each having a length in the radial direction shorter than the length of the first protrusion patterns in the radial direction,
   each of the first and the second protrusion patterns comprises a plurality of crystal grains,
   an average distance between the crystal grains being 0.5 to 3.0 nm,
   magnetic portions are respectively stacked on the crystal grains in each of the first and the second protrusion patterns, wherein an average distance between the magnetic portions on one of the first and the second protrusion patterns is less than the average distance between the crystal grains, and
   a nucleation field Hn for magnetization reversal and a coercive force Hc in each of the first protrusion patterns satisfy the following inequalities:

$Hn \geq 1.5$ kOe and $0.5$ kOe $\leq Hc - Hn \leq 1.5$ kOe.

7. A bit patterned medium comprising:
   a substrate; and
   a magnetic recording layer positioned above the substrate and provided a servo region and a data region,
   wherein the servo region comprises first protrusion patterns each having a length of 1 μm or more in a radial direction of the medium,
   the data region comprises one or more of second protrusion patterns each having a length in the radial direction shorter than the length of the first protrusion patterns in the radial direction,
   each of the first and the second protrusion patterns comprises a plurality of crystal grains, an average distance between the crystal grains being 0.5 to 3.0 nm,
   each of the first and the second protrusion patterns is covered with a magnetic layer, and
   each of the first protrusions has a nucleation field Hn for magnetization reversal and a coercive force Hc in each of the first protrusion patterns satisfy the following inequalities:

$Hn \geq 1.5$ kOe and $0.5$ kOe $\leq Hc - Hn \leq 1.5$ kOe.

8. The bit patterned medium of claim 7, wherein a height of the crystal grains is 2 to 15 nm.

9. The bit patterned medium of claim 7, wherein an average grain size of the crystal grains is less than or equal to 30 nm.

10. The bit patterned medium of claim 7, wherein a material of the crystal grains is selected from one or more of the following: Co, CoPt, CoPd, CoCrPt, CoCrPtB, CoRuPt and CoCuPt.

11. The bit patterned medium of claim 10, wherein the material of the crystal grains is CoPt.

12. A magnetic recording apparatus comprising:
    a bit patterned medium comprising:
    a substrate; and
    a magnetic recording layer positioned above the substrate and provided a servo region and a data region; and
    a magnetic head configured to write information on the bit patterned medium,
    wherein the servo region comprises first protrusion patterns each having a length of 1 μm or more in a radial direction of the medium, the data region comprises one or more of second protrusion patterns each having a length in the radial direction shorter than the length of the first protrusion patterns in the radial direction, each of the first and the second protrusion patterns comprises a plurality of crystal grains, an average distance between the crystal grains being 0.5 to 3.0 nm, each of the first and the second protrusion patterns is covered with a magnetic layer, and a nucleation field Hn for magnetization reversal and a coercive force Hc in each of the first protrusion patterns satisfy the following inequalities:

$Hn \geq 1.5$ kOe and $0.5 \text{ kOe} \leq Hc - Hn \leq 1.5 \text{ kOe}.$

* * * * *